(12) United States Patent
Wang (10) Patent No.: US 7,187,361 B2
(45) Date of Patent: Mar. 6, 2007

(54) WIRELESS PORTABLE INPUT DEVICE AND RECEIVER OF THE SAME

(75) Inventor: Yung-Hui Wang, Taipei (TW)

(73) Assignee: Paten Wireless Technology Inc., Taipei (TW)

( * ) Notice: Subject to any disclaimer, the term of this patent is extended or adjusted under 35 U.S.C. 154(b) by 620 days.

(21) Appl. No.: 10/665,503

(22) Filed: Sep. 22, 2003

(65) Prior Publication Data

US 2005/0073499 A1   Apr. 7, 2005

(30) Foreign Application Priority Data

Nov. 13, 2002 (TW) .............................. 91218232 U (51) Int. Cl.
*G09G 5/08* (2006.01)
(52) U.S. Cl. ...................................... 345/163
(58) Field of Classification Search ......... 345/163–166
See application file for complete search history.

(56) References Cited

U.S. PATENT DOCUMENTS

| | | | |
|---|---|---|---|
| 6,225,981 B1 * | 5/2001 | Lu .............................. | 345/164 |
| 6,747,633 B2 * | 6/2004 | Jzuhsiag ...................... | 345/163 |
| 6,801,967 B2 * | 10/2004 | Nakamura et al. ............ | 710/62 |
| 6,903,725 B2 * | 6/2005 | Nacson ........................ | 345/163 |
| 6,909,421 B2 * | 6/2005 | Wang .......................... | 345/163 |
| 2002/0190950 A1 * | 12/2002 | Wang .......................... | 345/163 |
| 2005/0073499 A1 * | 4/2005 | Wang .......................... | 345/163 |

\* cited by examiner

*Primary Examiner*—Richard Hjerpe
*Assistant Examiner*—Kevin M. Nguyen
(74) *Attorney, Agent, or Firm*—Birch, Stewart, Kolasch & Birch, LLP (57) ABSTRACT

A wireless portable input device and a receiver of the same is disclosed. According to one aspect of the present invention, the receiver of the input device can be detached from the motherboard and stored within a receiving chamber of the input device when not in use. The receiver is rotatably mounted on the computer and is designed to be stored within the input device in a first space therewithin when not in use. With the buckling portion formed axially within a second space of the input device the receiver can be positioned therein so that the space occupation can be substantially reduced and also the receiver and the input device of the present invention can be easy assembled.

8 Claims, 13 Drawing Sheets

WIRELESS PORTABLE INPUT DEVICE AND RECEIVER OF THE SAME

This nonprovisional application claims priority under 35 U.S.C. § 119(a) on Patent Application No. 091218232 filed in Taiwan on Nov. 13, 2002, which is herein incorporated by reference.

BACKGROUND OF THE INVENTION

1. The Field of the Invention

The present invention provides a wireless portable input device and a receiver of the same, and more particularly relates to an input device for transmitting inputted signal to the receiver, and the receiver can be stored and positioned by a buckling portion of the input device when not in use.

2. Description of the Related Art

Figure 8:
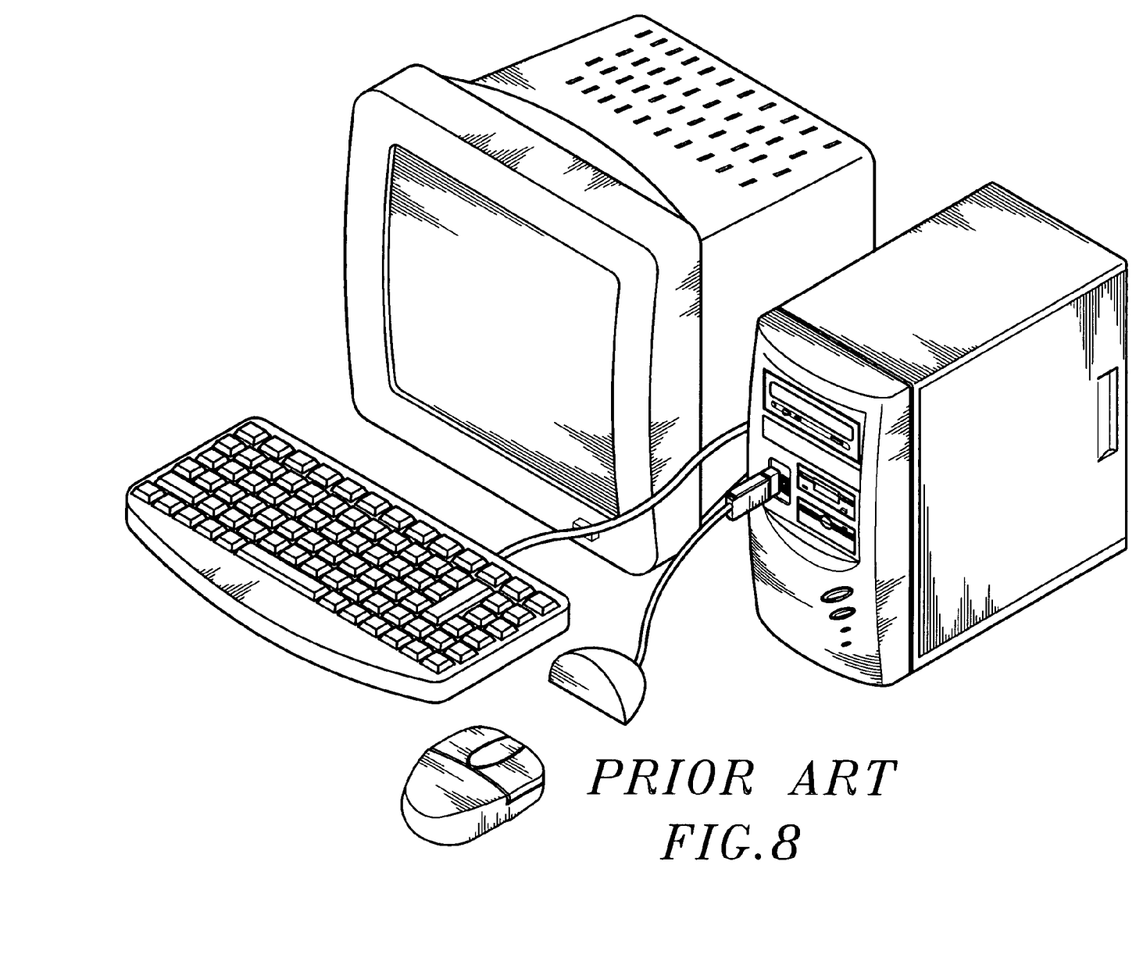
FIG. 8 is a perspective view showing the application of a conventional input device in a personal computer.

In recent years, the most common input means of computers are keyboard and mouse, wherein the mouse has successfully replaced the direction keys of the keyboard to move the cursor, and therefore the mouse has become an indispensable input device for a computer and many software programs are executable only through the mouse. There are two types of mouse in the market, namely mechanical and optical. The former functions through the rolling ball for transmitting the ordinate signals based on the degree of rolling and direction to the computer. The latter is based on the concept of light reflection for transmitting ordinate signals based on the distance and direction. Accompanying with the advanced computer technology, the mouse has been modified from wired to wireless and for the convenience of carriage and application in notebook or other computer devices overcoming the inconvenience provided by the conventional wired input devices. The idea of wireless control concept has also been applied in other input devices, such as keyboard, joystick and digitizer and the like. The above-mentioned wireless input devices have a receiver connected to the computer and being powered by a battery (as shown in FIG. 8). The input device is operated by the battery power to transmit the inputted signals to the receiver. However, the above conventional wireless input device has several defects as described below.

The receiver needs to be connected to the motherboard of the computer constantly, and therefore it occupies a certain space even when not in use. Although when the receiver is being detached from the computer, the space required for storing the receiver causes considerable inconvenience to the user. Due its bulky size, leads to increased manufacturing cost.

The conventional wireless input device either in use or not in use states, the two-piece design usually cause inconvenience to the user in view of carriage or storage thereof and even inconvenience caused due to misplacement or damage of the receiver due to the external force.

SUMMARY OF THE INVENTION

Accordingly, in the view of the foregoing, the present inventor makes a detailed study of related art to evaluate and consider, and uses years of accumulated experience in this field, and through several experiments, to create a new wireless input device and a receiver for the same suitable to apply in computers. The present invention provides an innovated cost effective wireless portable input device and a receiver of the same for use in computers.

One object of the present invention is to provide a wireless portable input device and a receiver of the same, which input device is capable of storing the receiver therewithin. The receiver can be detached from the motherboard and stored within a receiving chamber of the input device when not in use. The receiver is rotatably mounted on the computer and is designed such that it can be stored within the input device in a first space therewithin when not in use. With the buckling portion formed axially within a second space of the input device the receiver can be positioned therein so that the space occupation can be substantially reduced and also the receiver and the input device of the present invention can be easily assembled.

According to an aspect of the present invention, after the receiving portion of the receiver is positioned within the slot of the adaptor, the buckling portion formed in the slot can support the receiving portion for buckling within the groove of the receiving portion for positioning.

According to another aspect of the present invention, when the receiver is completely fitted into the first space of the base, the protruded pillar of the adaptor presses on the fine adjustment switch of the circuit board to switch off the power supply so that the power consumption can be effectively reduced.

BRIEF DESCRIPTION OF THE DRAWING

For a more complete understanding of the present invention, reference will now be made to the following detailed description of preferred embodiments taken in conjunction with the accompanying drawings, in which.

DETAILED DESCRIPTION OF PREFERRED EMBODIMENTS

Reference will be made in detail to the preferred embodiments of the invention, examples of which are illustrated in the accompanying drawings. Wherever possible, the same reference numbers are used in the drawings and the description to refer to the same or like parts.

Figure 1:
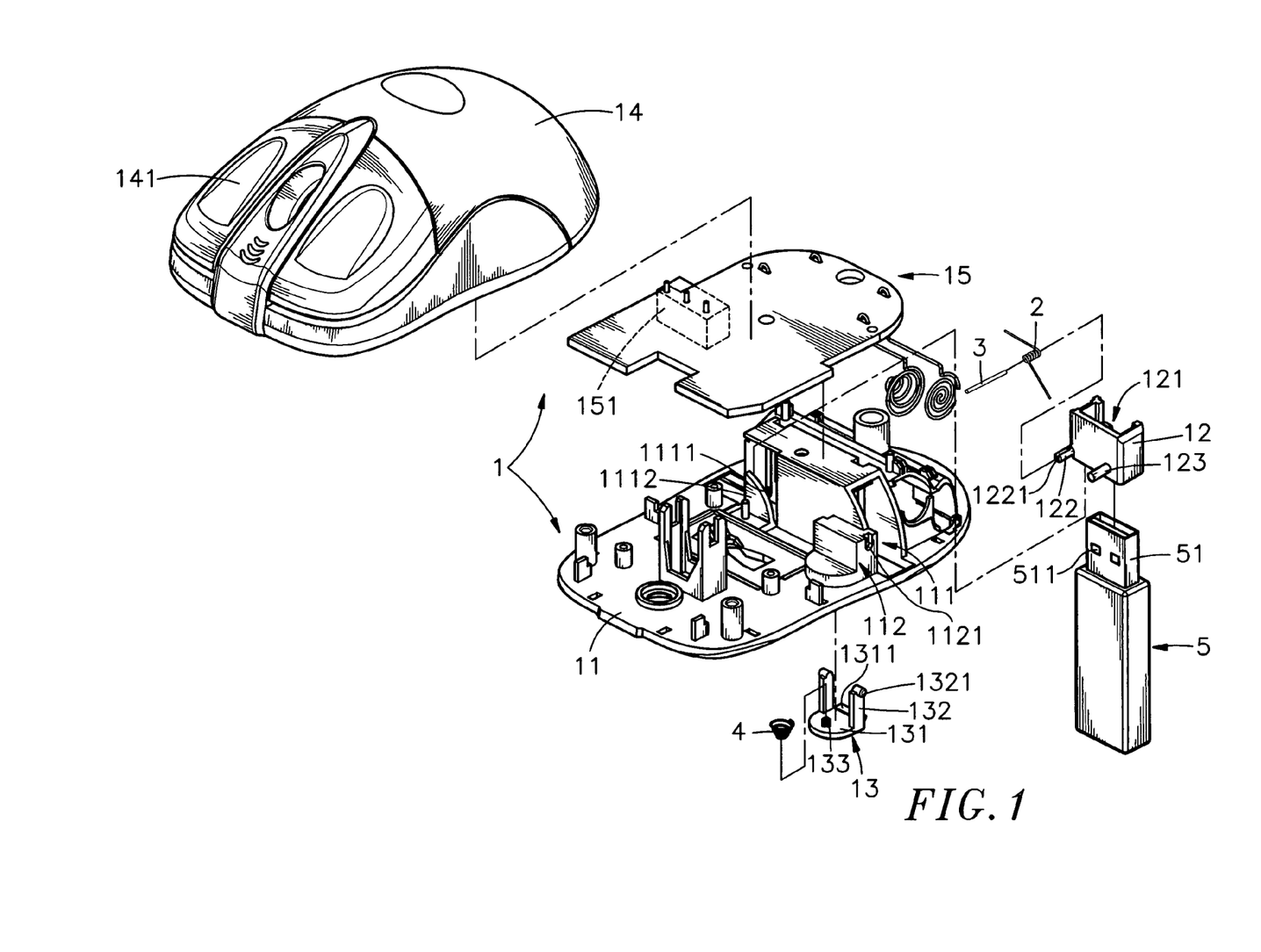
FIG. 1 is an exploded view of the input device of the present invention.
Figure 2:
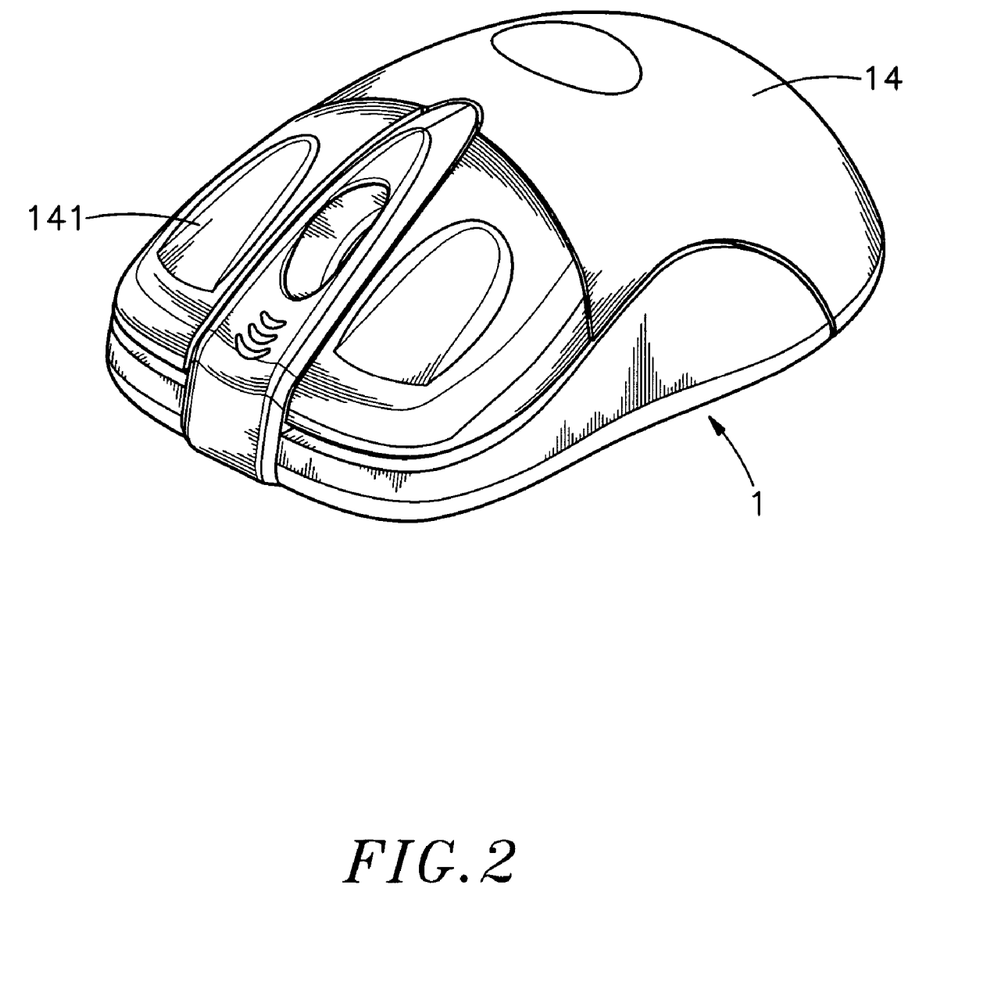
FIG. 2 is a perspective view of the input device of the present invention.

Referring to FIGS. 1 and 2, respectively show an exploded and a perspective view of the input device of the present invention. The input device 1 of the present invention comprises a base 11, an adaptor 12, a buckling portion 13, a command input portion 14 and a circuit board 15.

The base 11 comprises a first space 111 and a second space 112 on one side of the first space 111. The first space 111 and the second space 112 are adjoined to each other. The first space 111 has an axial hole 1111 on the sidewall thereof and an arch-shaped guiding plate 1112 at the outer side thereof. The second space 112 has through holes 1121 on two sidewalls thereof.

Figure 3:
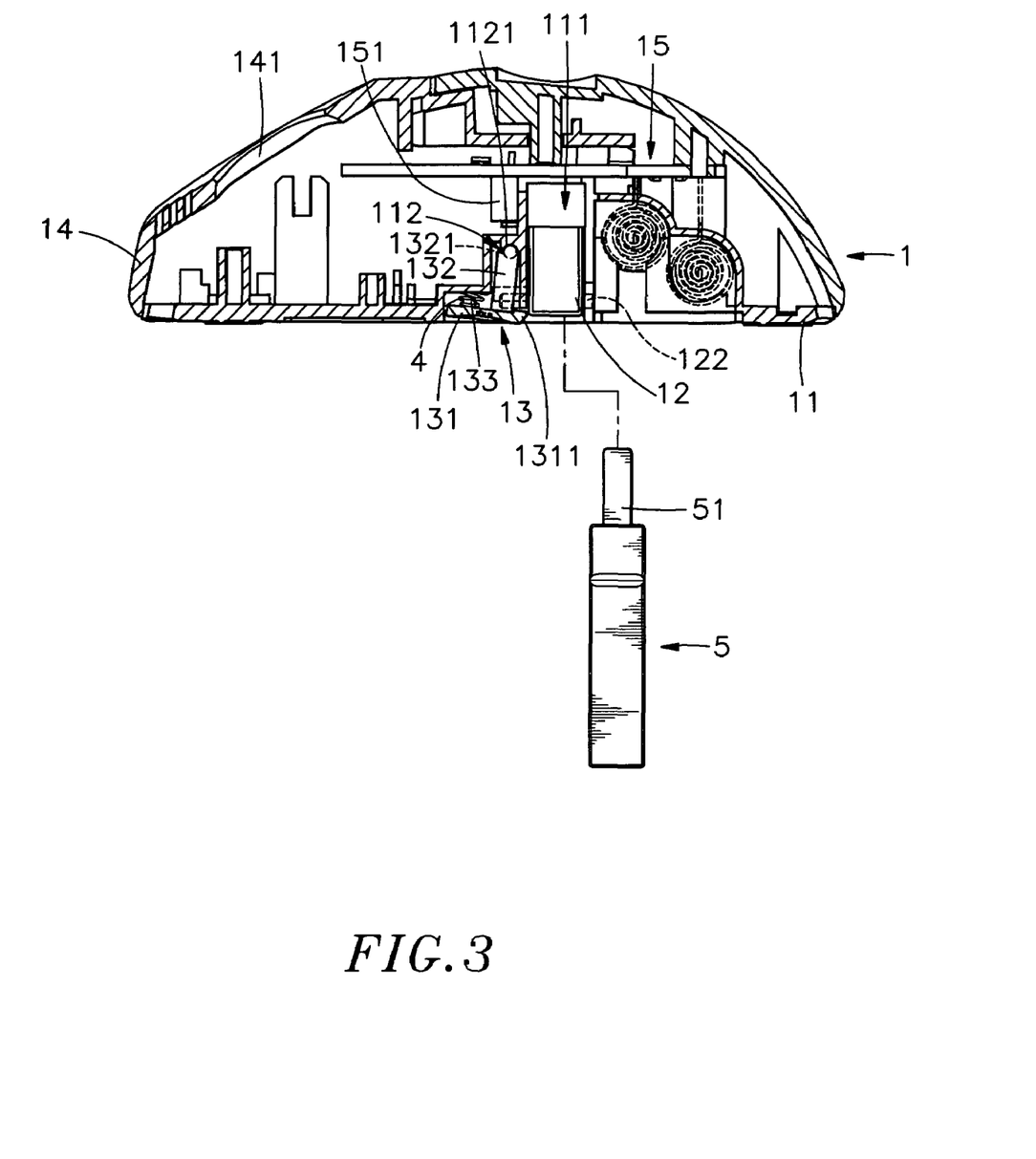
FIG. 3 is a sectional side view showing before fitting the receiver into the input device according to one preferred embodiment of the present invention.
Figure 3A:
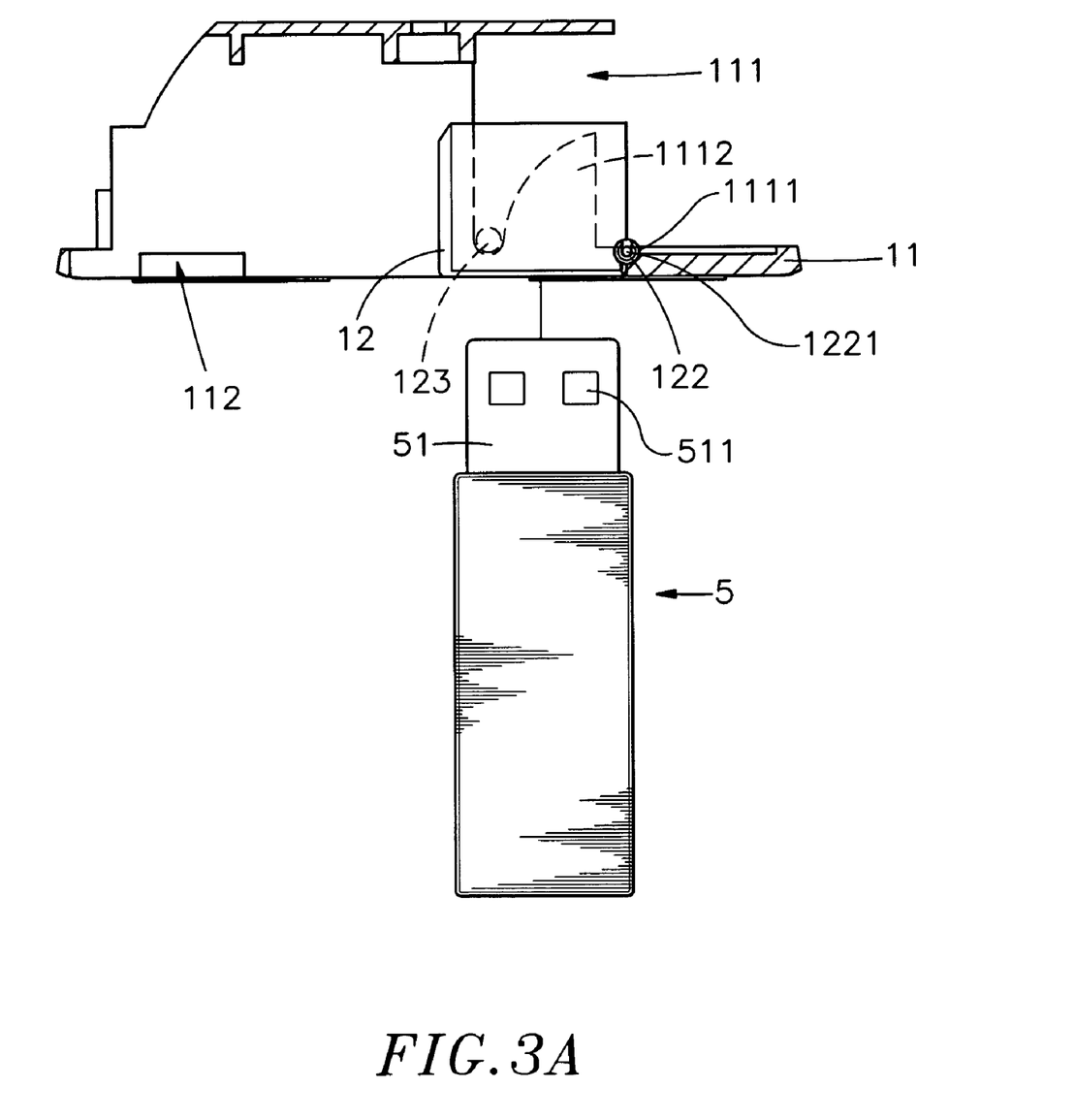
FIG. 3A is a sectional frontal view showing before fitting the receiver into the input device according to one preferred embodiment of the present invention.
Figure 3B:
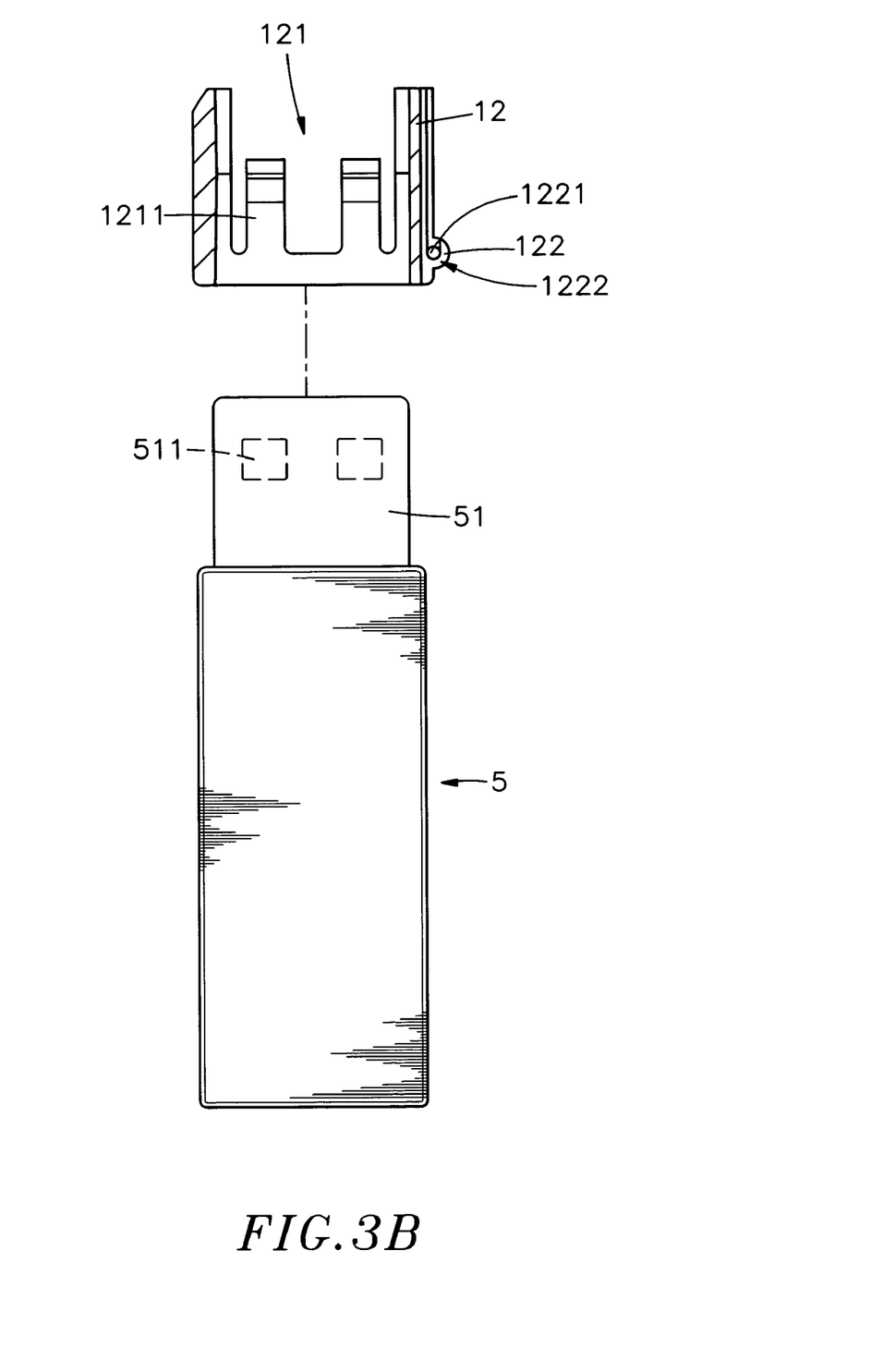
FIG. 3B is a sectional top view showing before fitting the receiver into the adaptor according to one preferred embodiment of the present invention.
Figure 4:
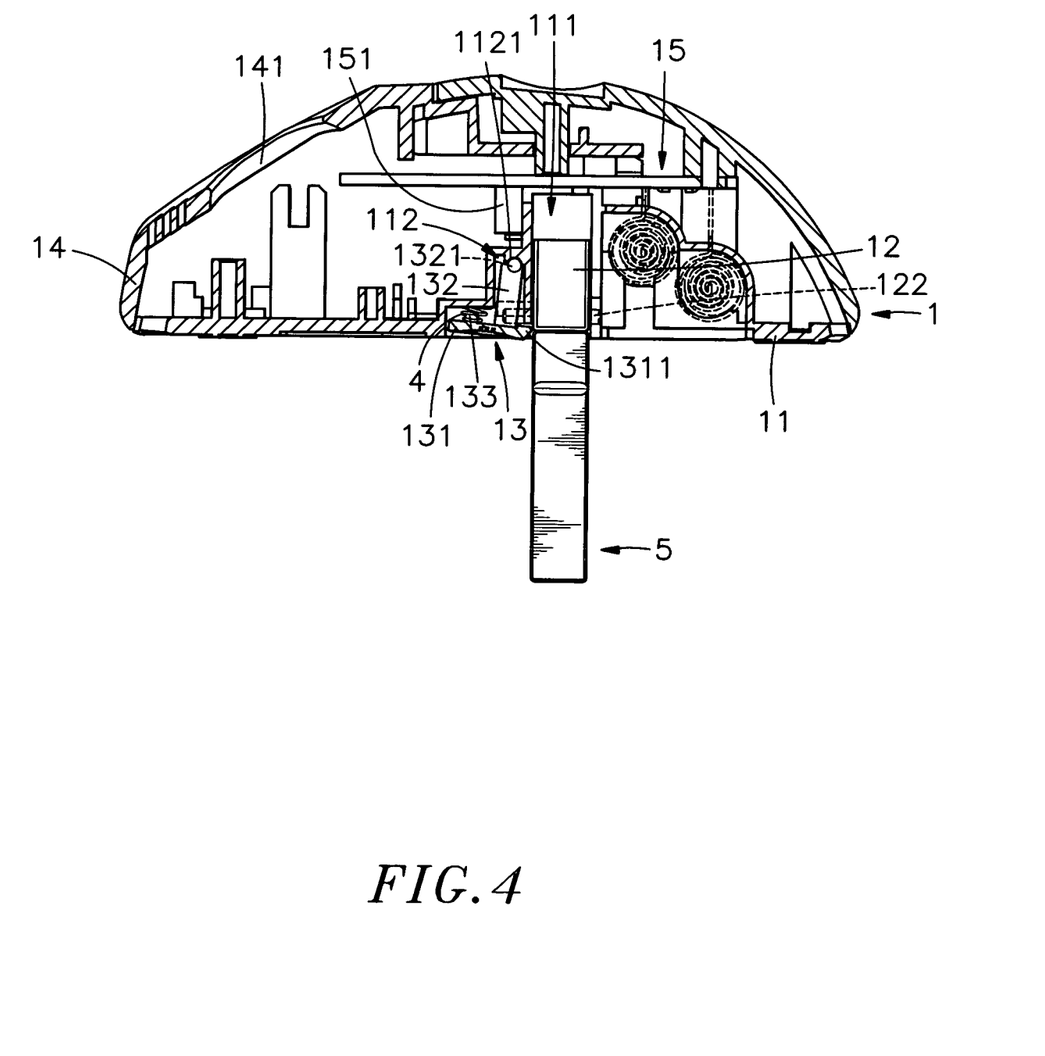
FIG. 4 is a sectional side view showing while fitting the receiver into the input device according to one preferred embodiment of the present invention.
Figure 4A:
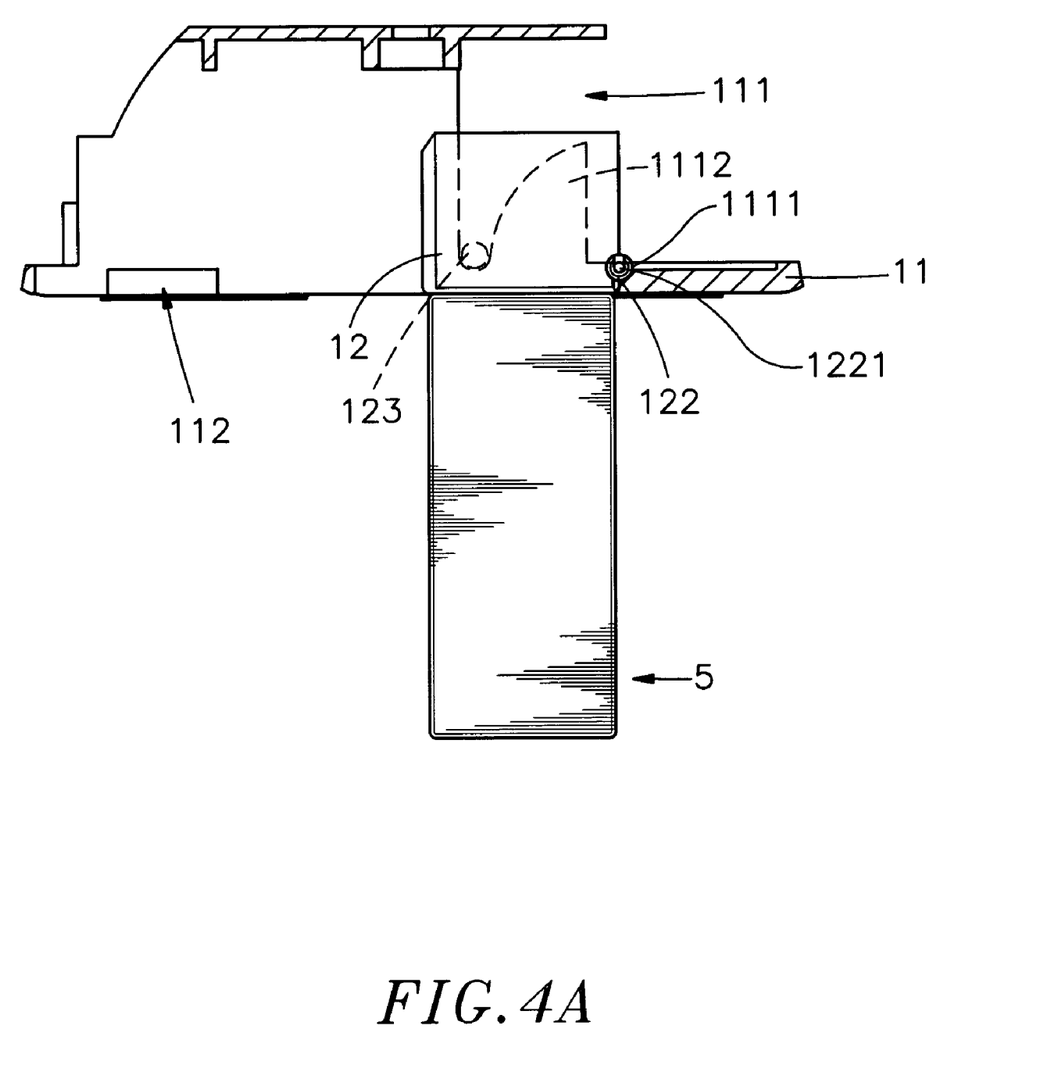
FIG. 4A is a sectional frontal view showing while fitting the receiver into the input device according to one preferred embodiment of the present invention.
Figure 4B:
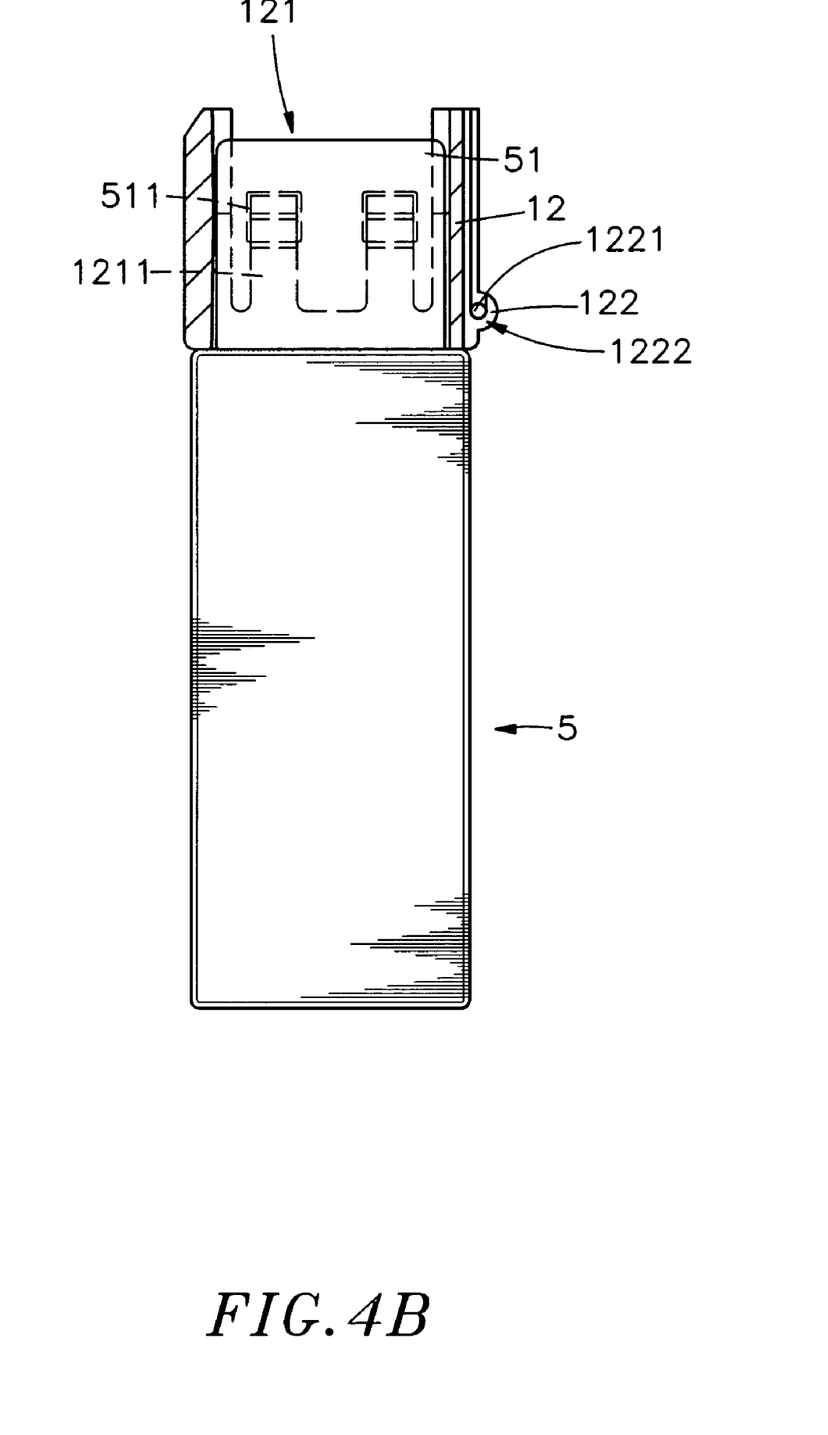
FIG. 4B is a sectional top view showing after fitting the receiver into the adaptor according to one preferred embodiment of the present invention.
Figure 5:
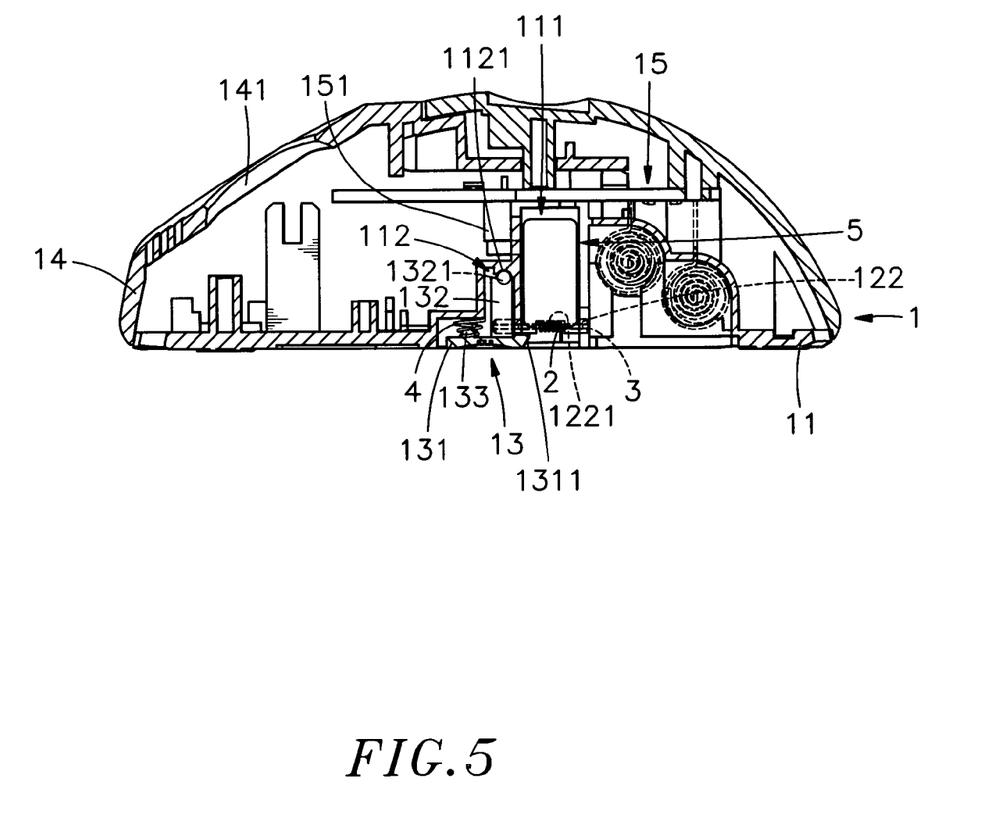
FIG. 5 is a sectional side view showing after fitting the receiver into the input device according to one preferred embodiment of the present invention.
Figure 5A:
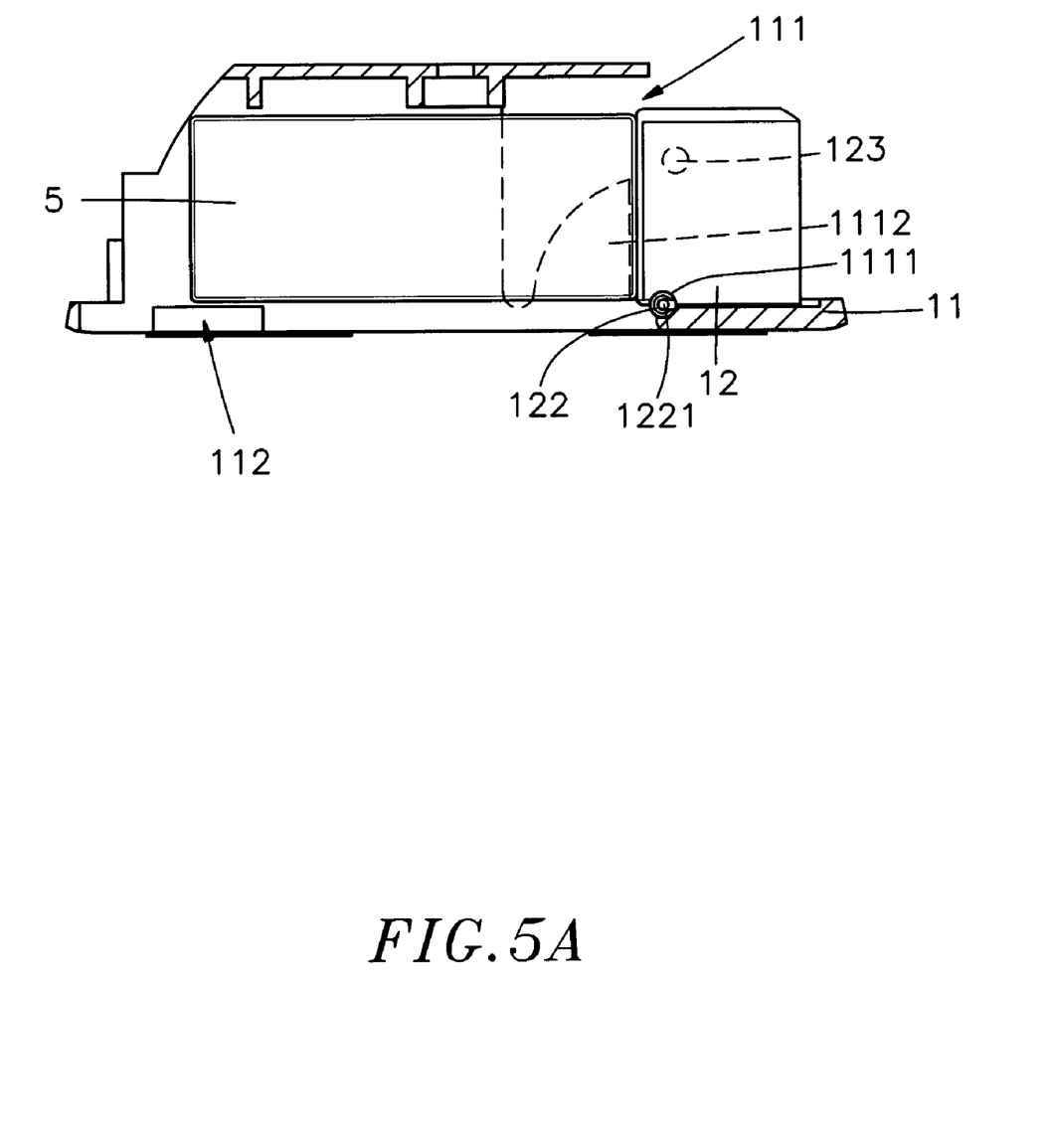
FIG. 5A is a sectional frontal view showing after fitting the receiver into the input device according to one preferred embodiment of the present invention.
Figure 6:
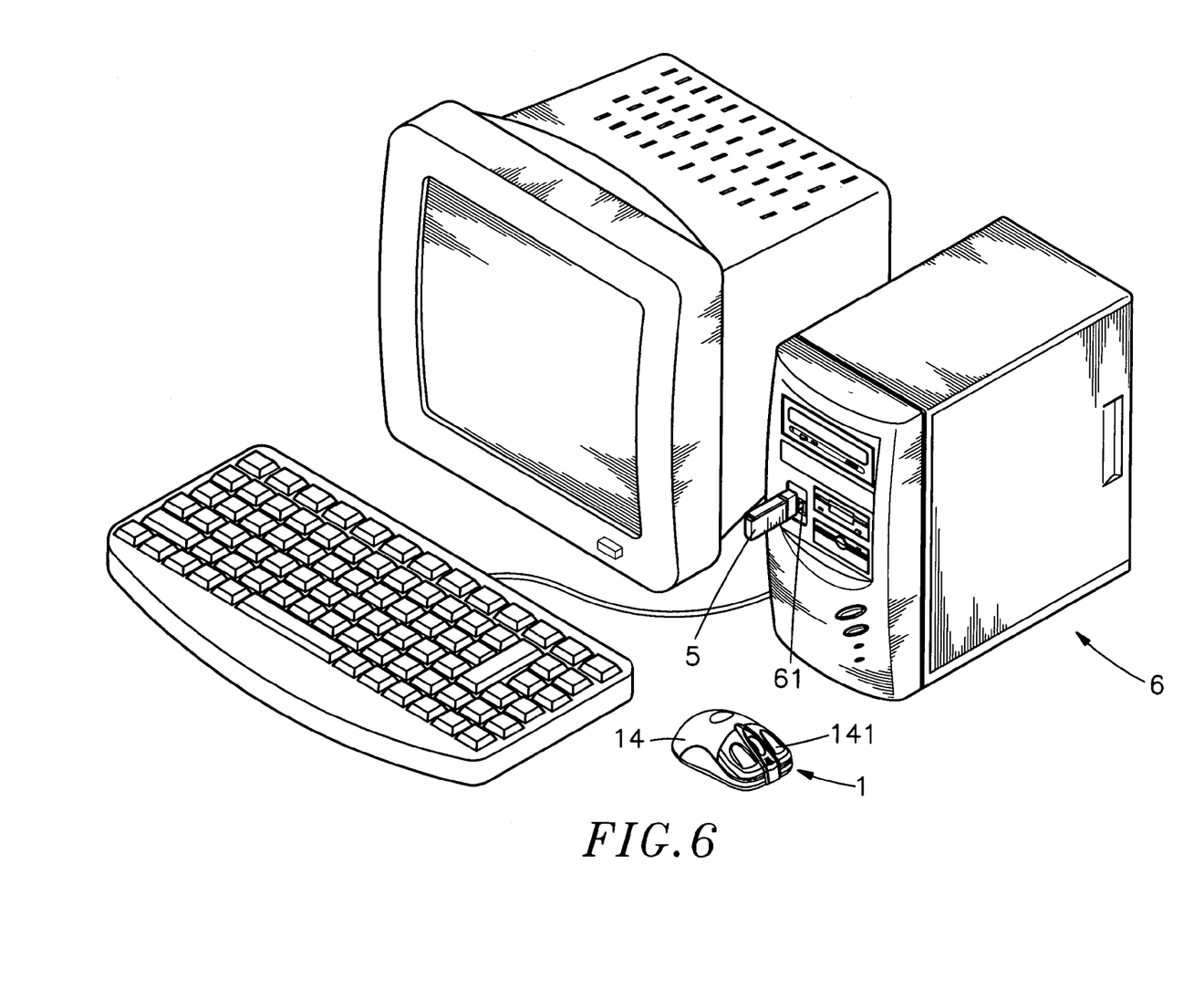
FIG. 6 is a perspective view showing the application of the input device in a personal computer according to one preferred embodiment of the present invention.
Figure 7:
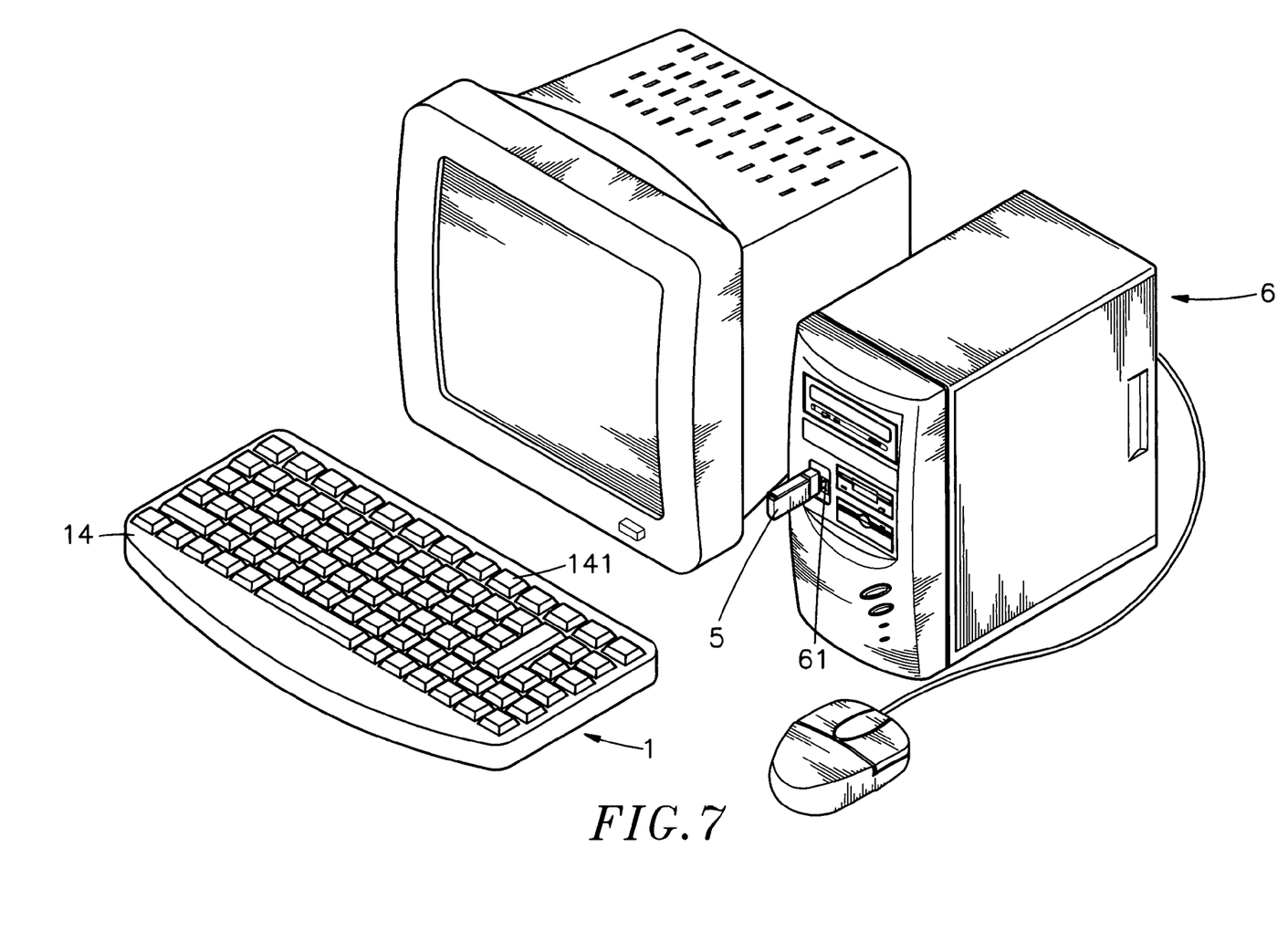
FIG. 7 is a perspective view showing the application of the input device in a personal computer according to another preferred embodiment or the present invention.

The adaptor 12 has a slot 121 formed at the central region thereof, and the slot 121 has a buckling portion 1211 therewithin (as shown in FIG. 3B). Protruded receiving members 122 are formed on the surface of the two sides of the adaptor 12, wherein each of the protruded receiving members 122 has a through hole 1221 penetrating axially through the protruded receiving members 122. In addition, an indentation 1222 is formed at the central region of each of the protruded receiving member 122, and the adaptor 12 also comprises a protruded pillar 123 formed on a side surface thereof.

The buckling portion 13 comprises a base 131, wherein the base 131 has a buckle 1311, and pads 132 that extend upwardly are formed on the two sides of the base 131. A horizontal protruded securing axle 1321 is at a distal end of each of the pad 132. A protruded positioning pillar 133 is positioned on a surface of the base 131 of the buckling portion 13.

The command input portion 14 comprises a plurality of buttons 141.

The circuit board 15 comprises a fine adjustment switch 151.

To assemble the above elements, first of all, the axle 3 covered by the resilient element 2 is fitted onto the through hole 1221 of each protruded receiving member 122 of the adaptor 12 in a manner to position the resilient element 2 into the indentation 1222 formed at the central region of each protruded receiving member 122. Next, the protruded receiving axle 122 formed on the surface of the two sides of the adaptor 12 is fitted into the axial hole 1111 formed on the sidewall of the first space 111 of the base 11, so that the protruded pillar 123 of the adaptor 12 can be supported on the guiding plate 1112 formed at the outer side of the first space 111 of the base 11, and this arrangement also allows the adaptor 12 axially rotate using the protruded receiving member 122 as an axis. The resilient element 2 is pressed to allow the rotation of the adaptor 12 to be resiliently elastic. Next, the protruded securing axle 1321 formed protruded on the pad 132 of the buckling portion 13 is fitted into the through hole 1121 of the second space 112, and then a resilient element 4 is fitted onto the protruded positioning pillar 133 of the buckling portion 13 so that the resilient element 4 presses between the bottom of the second space 112 and the base 131 of the buckling portion 13. Meanwhile, the buckle 1311 extending from the base 131 passes out of the second space 112 and remains within the first space 111. Finally, the command input portion 14 is positioned onto the base 11 and the circuit board 15 is fitted between the base 11 and the command input portion 14 to complete the assembly of the input device of the present invention.

Referring to FIGS. 3, 3A, 3B, 4, 4A, 4B, 5, 5A, 6 and 7, show respectively, the sectional side view showing before fitting the receiver into the input device, the sectional frontal view showing before fitting the receiver into the input device, the sectional top view showing before fitting the receiver into the adaptor, the sectional side view showing while fitting the receiver into the input device, the sectional frontal view showing while fitting the receiver into the input device, the sectional top view showing after fitting the receiver into the adaptor, the sectional side view showing after fitting the receiver into the input device, the sectional frontal view showing after fitting the receiver into the input device, the perspective view showing the application of the input device in a personal computer according to one preferred embodiment of the present invention, and the perspective view showing the application of the input device in a personal computer according to another preferred embodiment of the present invention. When the input device 1 is not in use, the user can detach the receiver 5 from the server 6 and fit the receiving portion 51 of the receiver 5 into the slot 121 of the adaptor 12, the buckling portion 1211 formed within the slot 121 can be buckled resiliently in the groove 511 of the receiving portion 51. The user can move the receiver 5 inwardly to motivate the adaptor 12 to rotate using the protruded receiving member 122 as an axis, and the resilient element 2 is pressed allowing the adaptor 12 to move elastically. As the receiver 5 is moved further, the surface of the receiver 5 will be supported at the buckle 1311 of the buckling portion 13, at the same time makes the buckling portion 13 to have a resilient biasing motion using the protruded securing axle 1321 as an axis. After the receiver 5 is fitted in the first space 111 of the base 11, the protruded pillar 123 of the adaptor 12 presses onto the fine adjustment switch 151 of the circuit board 15 to cut the power supply, and the buckling portion 13 will return to the original position due to the elasticity of the resilient element 4 using the protruded securing axle 1321 as an axis. Thus, the buckle 1311 of the buckling portion 13 is for securely positioning on the surface of the receiver 5. Accordingly, the embodiment of the present invention depicted above can substantially reduce the power consumption, has the advantages of easy storage, less space occupation and for securely positioning the receiver.

When the user intends to reuse the input device 1, all the user needs to do is to press the buckling portion 13 to have a resilient biasing motion using the protruded securing axle 1321 as an axis. At the same time the buckle 1311 of the buckling portion 13 can be released from the receiver 5. Next, the adaptor 12 is rotated axially aided by the elasticity of the resilient element 2 using the protruded receiving member 122 as an axis. Meanwhile the protruded pillar 123 of the adaptor 12 is released from the fine adjustment switch 151 of the circuit board 15 and thereby restoring power. The receiver 5 accordingly released from the first space 111 of the base 11, so that the user can remove the receiver 5 from the slot 121 of the adaptor 12 and fit into the connector port 61 of the server 6 for executing inputted commands.

Accordingly, the concept of the wireless portable input device of the present invention having storable means for storing the receiver described above can be suitably applied in various input devices, such as mouse, keyboard, joystick and the like. Therefore, even though a mouse is used to describe the best mode of the present invention, accordingly, it is intended to embrace all such alternatives, modifications, and variations in which fall within the spirit and scope of the included claims.

The advantages of the present invention are as following:

1. When the input device 1 is not in use, the receiver 5 can be detached from the server 6 and fitted into the adaptor 12. Next, the adaptor 12 is rotated in a manner to store the receiver 5 in the first space 111, wherein the buckling portion 13 formed in the second space 112 securely positions the receiver 5 so that the space occupation can be effectively reduced, and also assembly of the receiver and the input device can be easily achieved.

2. By fitting the receiving portion 51 of the receiver 5 into the slot 121 of the adaptor 12, the buckling portion 1211 in the slot 121 buckles to the groove 511 of the receiving portion 51 for securely positioning.

3. When the receiver 5 completely is stored in the first space 111 of the base 11, the protruded pillar 123 of the adaptor 12 presses against the fine adjustment switch 151 of the circuit board 15 to cut the power supply so that the power consumption can substantially reduced.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

The invention claimed is:

1. A wireless portable input device and a receiver of the same, said input device comprising:
    a first base of said input device, comprising a first space and a second space at one side of said first space, said first space and said second space adjoining each other;
    an adaptor, rotatably attached within said first space;
    a buckling portion formed within said second space, comprising a second base of said buckling portion having a buckle that extends upwardly, wherein said buckle can reach out of said second space and position in said first space, wherein said adaptor is for fitting said receiver and said receiver is to be stored in said first space and positioned using said buckling portion to position;
    a command input portion, comprising a plurality of buttons securely positioned onto said base; and
    a circuit board, positioned between said base and said command input portion, comprising a fine adjustment switch.

2. The wireless portable input device according to claim 1, wherein said first space of said first base has an axial hole on a sidewall, and said adaptor has a protruded receiving member formed within said axial hole of said first space, and wherein said adaptor can rotate using said protruded receiving member as an axis.

3. The wireless portable input device according to claim 2, wherein said protruded receiving member of said adaptor has a though hole that axially pass though said protruded receiving member and has an indentation formed at the central region of the protruded receiving member, said through hole of said protruded receiving member is for fitting an axle which is fitted with a resilient element within said indentation.

4. The wireless portable input device according to claim 1, wherein said first space of said first base has a guiding plate formed at the outer side and a protruded pillar is formed on a side surface of said adaptor, wherein when said adaptor rotates within said first space, the protruded pillar of said adaptor can move on said guiding plate of said first space, at the same time presses onto said fine adjustment switch of said circuit board for terminating the power supply.

5. The wireless portable input device according to claim 1, wherein said two sides of said second base of said buckling portion has a pad extending upwardly with a protruded securing axle; said second space has through hole on two sidewalls for positioning said protruded securing axle of said buckling portion.

6. The wireless portable input device according to claim 1, wherein said second base of said buckling portion has a protruded positioning pillar on the surface, and around said protruded positioning pillar is covered with a resilient element, said resilient element supports between a bottom of said second space and said second base of said buckling portion.

7. The wireless portable input device according to claim 1, wherein said adaptor has a slot that has a buckling portion formed extending therewithin.

8. The wireless portable input device according to claim 1, wherein said input device is comprised of a mouse, a keyboard, a joystick or any electronic device with input functions.

* * * * *